(12) United States Patent
Yokoyama et al.

(10) Patent No.: US 8,388,071 B2
(45) Date of Patent: Mar. 5, 2013

(54) BRAKING CONTROLLER

(75) Inventors: Atsushi Yokoyama, Arakawa (JP);
Hidekazu Moriki, Hitachinaka (JP);
Masaru Ito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 613 days.

(21) Appl. No.: 12/516,310

(22) PCT Filed: Jan. 16, 2008

(86) PCT No.: PCT/JP2008/050416
§ 371 (c)(1),
(2), (4) Date: Jan. 6, 2010

(87) PCT Pub. No.: WO2008/090785
PCT Pub. Date: Jul. 31, 2008

(65) Prior Publication Data
US 2010/0127562 A1    May 27, 2010

(30) Foreign Application Priority Data
Jan. 24, 2007    (JP) ................................ 2007 014367

(51) Int. Cl.
*B60T 8/64*    (2006.01)
(52) U.S. Cl. ........ 303/152; 303/149; 303/151; 180/65.2
(58) Field of Classification Search .................. 303/151, 303/152, 148, 149, 3; 180/65.2
See application file for complete search history.

(56) References Cited

U.S. PATENT DOCUMENTS
5,967,621 A * 10/1999 Ito et al. .......................... 303/15
(Continued)

FOREIGN PATENT DOCUMENTS
JP    5-161213 A    6/1993
JP    9-104333 A    4/1997
(Continued)

OTHER PUBLICATIONS
International Search Report dated May 1, 2008 with a partial English translation (Five (5) pages).
(Continued)

*Primary Examiner* — Robert A Siconolfi
*Assistant Examiner* — Mariano Sy
(74) *Attorney, Agent, or Firm* — Crowell & Moring LLP

(57) ABSTRACT

A braking controller is equipped to provide braking force distribution of the required total braking force, to distribute the required total braking force by regeneration distribution. The regeneration distribution is required to be within a rear-wheel dominant range, in which the distribution ratio is inclined toward the rear-wheels when compared with an ideal distribution line that provides distribution enabling the front and rear wheels to simultaneously lock, as well as within a range that is not greater than a rear-wheel locking limit enabling the rear wheels to lock in relation to a road-surface friction coefficient upon braking. A rear-wheel braking force change ratio, which is a change ratio of the rear-wheel braking force with regard to a change of the front-wheel braking force associated with the change of the required total braking force, is required to always be positive.

14 Claims, 7 Drawing Sheets

U.S. PATENT DOCUMENTS

| | | | |
|---|---|---|---|
| 6,910,747 B2 * | 6/2005 | Tsunehara | 303/152 |
| 6,988,779 B2 * | 1/2006 | Amanuma et al. | 303/152 |
| 7,059,691 B2 * | 6/2006 | Tsunehara et al. | 303/152 |
| 7,077,484 B2 * | 7/2006 | Sasaki et al. | 303/152 |
| 7,167,783 B2 * | 1/2007 | Park et al. | 701/22 |
| 7,426,975 B2 * | 9/2008 | Toyota et al. | 180/165 |
| 7,878,605 B2 * | 2/2011 | Kokubo et al. | 303/151 |
| 2003/0062770 A1 | 4/2003 | Sasaki et al. | |
| 2004/0070270 A1 | 4/2004 | Gunji | |
| 2005/0159871 A1 * | 7/2005 | Nakamura et al. | 701/70 |
| 2006/0131956 A1 | 6/2006 | Matsuura et al. | |
| 2008/0079311 A1 * | 4/2008 | Schneider et al. | 303/152 |

FOREIGN PATENT DOCUMENTS

| | | |
|---|---|---|
| JP | 2003-174703 A | 6/2003 |
| JP | 2005-151633 A | 6/2005 |
| JP | 2006-199270 A | 8/2006 |

OTHER PUBLICATIONS

Corresponding European Search Report dated Dec. 27, 2010 (Four (4) pages).
Form PCT/IB/338 (one (1) page); Form PCT/IB/373 (one (1) page); Form PCT/ISA/237 (four (4) pages); totaling (six (6) pages).

* cited by examiner (a)

(b)

BRAKING CONTROLLER

TECHNICAL FIELD

The present invention relates to a braking controller used for the braking control of a vehicle having a regenerative braking function and specifically relates to a braking controller suitable for the braking control of a vehicle whose front wheels and rear wheels are asymmetrical with regard to regeneration.

BACKGROUND ART

In a vehicle equipped with an electric motor as a traveling drive source, the electric motor is capable of executing regenerative braking, and by collecting electric energy converted from kinetic energy of the vehicle by the regenerative braking, energy efficiency can be increased.

There are various types of vehicles that are able to execute regenerative braking. One of those is a vehicle in which front wheels and rear wheels have different regeneration capabilities, that is, a vehicle whose front wheels and rear wheels are asymmetrical with regard to regeneration. For example, there is a vehicle in which only the rear wheels can execute regenerative braking and the front wheels can execute only friction braking; or, there is a vehicle in which the front wheels and rear wheels have different transmission efficiency in regenerative braking, causing a difference in regeneration capability in such a way that the regeneration capability of the front wheels becomes smaller than that of the rear wheels.

In such a vehicle whose front wheels and rear wheels are asymmetrical with regard to regeneration, by increasing the braking force distribution to the rear wheels as much as possible within a range in which the traveling stability of the vehicle can be sufficiently ensured, it is possible to increase the amount of regeneration, thereby increasing the energy efficiency of the vehicle. Well-known technology based on such a concept has been disclosed, for example, in patent literature 1 and patent literature 2.

In technology in patent literature 1, in the diagram of the braking force distribution line between front and rear wheels, by controlling the regenerative braking force so that the total braking force line showing the sum of the fluid pressure braking force and the regenerative braking force can be located at the rear-wheel locking limit or its vicinity, it is made possible to make the best use of regenerative braking within the range other than the area where the rear wheels lock first.

Also, in technology in patent literature 2, to increase the amount of regeneration of the front and rear motors, upper-limit braking torque of the rear wheel motor is specified according to the state of the road surface (road-surface friction coefficient and the like) so that the amount of regeneration can be distributed by the front wheel motor and the friction brake. That is, when the target braking torque of the rear wheel motor becomes too much, the rear wheels tend to easily slip, and therefore, the target braking torque of the rear wheel motor is controlled so that it will not exceed the allowable maximum value according to the state of the road surface. By doing so, it is possible to distribute as much torque as possible with regard to the target reduction torque to the target braking torque of the rear wheel motor while limiting the rear wheel motor within the range in which a predetermined frictional force between the rear wheels and the road surface can be ensured.

Patent literature 1: Japanese Patent Laid-open No. Hei 9(1997)-104333
Patent literature 2: Japanese Patent Laid-open No. 2005-151633

DISCLOSURE OF INVENTION

Problems to be Solved by the Invention

With regard to the distribution of required total braking force to both of front and rear wheels, one standard is ideal distribution which enables the required total braking force to be distributed at a distribution ratio so that the front and rear wheels simultaneously lock. However, in a vehicle whose front wheels and rear wheels are asymmetrical with regard to regeneration, it is not possible to increase the amount of regeneration to more than a certain quantity by the distribution control according to the ideal distribution.

It can be said that the traveling stability will not be deteriorated even if the distribution ratio is inclined toward the rear wheels in the ideal distribution within the range in which the rear wheels do not lock first. From the relationship between the braking control and traveling stability, in a vehicle whose front wheels and rear wheels are asymmetrical with regard to regeneration, a braking force that enables the rear wheels to lock is obtained based on the road-surface friction coefficient upon braking, and the obtained value is considered to be the maximum distribution to the rear wheels; and by the distribution control according to distribution (hereafter, temporarily referred to as regeneration distribution) in which the distribution ratio is inclined toward the rear wheels when compared to an ideal distribution within the range not greater than the maximum distribution, it is possible to increase the amount of regeneration thereby increasing energy efficiency of the vehicle while sufficiently ensuring traveling stability. The technology in the above-mentioned patent literature 2 can be considered one of those technologies related to regeneration distribution.

However, distribution control according to regeneration distribution has a problem with smooth braking. That is, although the responsiveness of friction braking is generally inferior to that of regenerative braking, in association with the matter, control accuracy over the required total braking force may decrease in distribution control according to regeneration distribution, which may deteriorate the smoothness of braking. For example, in the technology disclosed in patent literature 2, although an allowable maximum value (maximum distribution) of target braking torque of the rear wheel motor is specified according to the state of the road surface, depending on the method of setting the target braking torque not greater than the allowable maximum value, in some cases, it is necessary to adjust the total braking force of the entire vehicle by the braking of only the front wheels or rear wheels. In that case, control responsivity required for each wheel may become excessive. That is, when distribution that is deviated from the ideal distribution is executed, braking force can be flexibly distributed to the front and rear wheels and controlled, however, there is a possibility that the change rate of the target braking force becomes excessive with regard to the capability of the front wheel or rear wheel controller. And once such a state occurs and if responsiveness of actual braking force to the target braking force becomes insufficient, control accuracy decreases and improper front-back acceleration or vibration may occur, which may deteriorate the smoothness of braking.

The present invention was made based on the above-mentioned knowledge, and its purpose is to provide a braking controller, for a vehicle whose front wheels and rear wheels are asymmetrical with regard to regeneration, which has a high control accuracy over the required total braking force and enables more smooth braking, and also increases the amount of regeneration to increase energy efficiency of the vehicle while ensuring traveling stability.

Means for Solving the Problems

To solve the above-mentioned problems, the present invention provides a braking controller, used for braking control of a vehicle which is capable of applying a brake to rear wheels by regenerative braking of an electric motor, comprising a braking force distribution means for controlling distribution of the required total braking force provided by a driver's operation input and a road-surface friction coefficient detection means for detecting a road-surface friction coefficient, wherein the braking force distribution means distributes the required total braking force by regeneration distribution, the regeneration distribution is required to be within the rear-wheel dominant range in which the distribution ratio is inclined toward the rear wheels when compared to an ideal distribution which distributes the required total braking force at a distribution ratio that enables the front wheels and rear wheels to simultaneously lock; the regeneration distribution is also required to be within the range not greater than the rear-wheel locking limit braking force that enables the rear wheels to lock in relation with a road-surface friction coefficient detected by the road-surface friction coefficient detection means; and a rear-wheel braking force change ratio which is a rear-wheel braking force change ratio with regard to the change of the front-wheel braking force associated with the change of the required total braking force is required to always be positive.

In such a braking controller, because regeneration distribution is executed in which the distribution ratio is inclined toward the rear wheels when compared with the ideal distribution on the condition that regeneration distribution is not greater than the rear-wheel locking limit braking force, it is possible to increase the amount of regeneration and increase energy efficiency while avoiding the rear wheels from locking first. Furthermore, because regeneration distribution is executed so that the rear-wheel braking force change ratio is always required to be positive, it is possible to ensure sufficient control accuracy over the required braking force, thereby increasing the smoothness of braking.

In the above-mentioned braking controller according to the present invention, with regard to a reference braking force specified for the front-wheel braking force, the braking force distribution means executes distribution control so that when the front-wheel braking force is smaller than the reference braking force, the rear-wheel braking force change ratio in the regeneration distribution is larger than the rear-wheel braking force change ratio in the ideal distribution, and when the front-wheel braking force is larger than the reference braking force, the rear-wheel braking force change ratio in the regeneration distribution is smaller than the rear-wheel braking force change ratio in the ideal distribution. By doing so, braking force changes of both the front and rear wheels can be properly controlled, thereby enabling smoother braking.

In the above-mentioned braking controller according to the present invention, the braking force distribution means executes distribution control by differentiating distribution ratios so that the increase-direction rear-wheel distribution ratio is smaller than the decrease-direction rear-wheel distribution ratio according to the change direction of the required total braking force. By doing so, even when response of the front-wheel braking is slower than that of the rear-wheel regenerative braking, it is possible to ensure sufficient control accuracy over required braking force, thereby increasing the smoothness of braking.

Furthermore, in the above-mentioned braking controller according to the present invention, the braking force distribution means executes distribution control so that the ratio of distribution to the rear wheels decreases as the change rate of the required total braking force increases. By doing so, even when the required total braking force rapidly changes, it is possible to ensure sufficient control accuracy over the required braking force, thereby increasing the smoothness of braking.

Furthermore, in the above-mentioned braking controller according to the present invention, the braking force distribution means executes distribution control so that when an error between the target braking force and the actual braking force of front wheels becomes equal to or more than the predetermined threshold, the ratio of distribution to the rear wheels is increased so as to satisfy the required total braking force. By doing so, even when the change rate of the required total braking force fluctuates, it is possible to ensure sufficient control accuracy over the required braking force, thereby increasing the smoothness of braking.

Advantages of the Invention

According to the above-mentioned present invention, a braking controller can be achieved which has high control accuracy over the required total braking force and smooth braking capability and is capable of increasing the amount of regeneration as well as increasing the vehicle's energy efficiency while ensuring the traveling stability.

LEGEND

1: Brake pedal, 2: Operation quantity detector, 7FL and 7FR: Front wheel, 7RL and 7RR: Rear wheel, 10: Braking controller, 13: Electric motor, 21: Required total braking force calculation means, 22: Road-surface friction coefficient detection means, 23: Front-wheel/rear-wheel braking force distribution means (braking force distribution means).

BEST MODE FOR CARRYING OUT THE INVENTION

Figure 1:
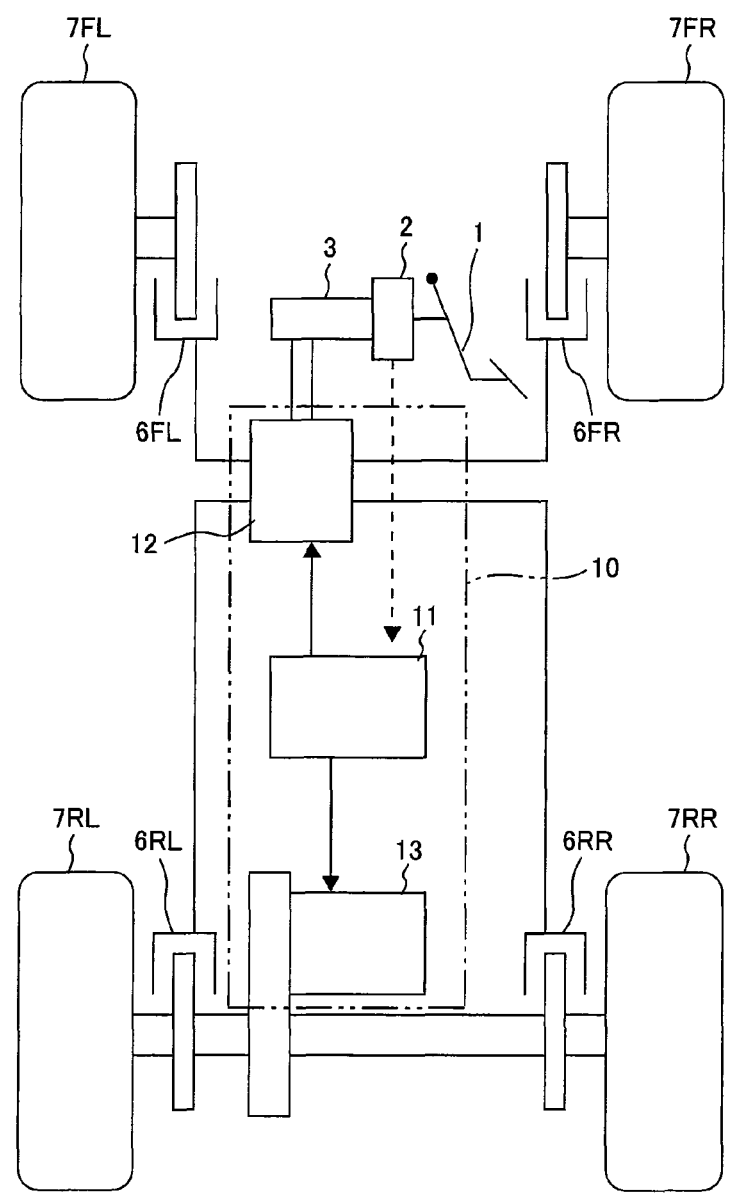
FIG. 1 is a schematic drawing showing the situation in which a braking controller according to an embodiment is installed on a vehicle.

Hereafter, an embodiment of the present invention will be explained. FIG. 1 is a schematic drawing showing the situation in which a braking controller according to an embodiment is installed on a vehicle. This embodiment is to be applied to a vehicle wherein the front wheels, which are the driven wheels, are braked only by the friction braking and the rear wheels, which are the drive wheels, are braked by both regenerative braking and friction braking.

The vehicle is equipped with a brake pedal 1 operated by a driver, and an operation quantity detector 2 attached to the brake pedal 1 that detects the operation quantity of the brake pedal 1. A hydraulic master cylinder 3 that converts an operation force of the brake pedal 1 to pressure is connected to the brake pedal 1. The operation quantity detector 2 is electrically connected to the braking controller 10.

The braking controller 10 comprises a control arithmetic unit 11, friction brake controller 12, and an electric motor 13. The control arithmetic unit 11 controls the pressure of the friction brake and motor torque by adjusting current to the friction brake controller 12 and the electric motor 13. To do so, in addition to the operation quantity of the brake pedal 1, information from various vehicle state detectors, not shown, is inputted into the control arithmetic unit 11. Vehicle state detectors include a variety of sensors, such as front-back acceleration sensor, lateral acceleration sensor, yaw rate sensor, steering angle sensor, wheel speed sensor, vehicle speed sensor, and friction brake pressure sensor.

The friction brake controller 12 is connected to the master cylinder 3 and is also connected to the front-wheel friction brakes 6FL, 6FR and rear-wheel friction brakes 6RL, 6RR. The friction brake controller 12 transmits the pressure of the master cylinder 3 directly to the friction brake 6 (6FL to 6RR) when the vehicle's electrical system has not been activated, and when the vehicle's electrical system has been activated, the friction brake controller 12 electronically controls the pressure of the friction brake 6 of each wheel based on electric signals from the control arithmetic unit 11. Pressure of the friction brake 6 is mechanically converted to the braking force of each of the front wheels 7FL, 7FR and rear wheels 7RL, 7RR.

The electric motor 13 generates drive torque and braking torque due to current flowing from the control arithmetic unit 11, thereby controlling the drive force and braking force of the rear wheels 7RL, 7RR. Braking torque generated by the electric motor 13 is stored as electric energy in a battery, not shown.

Figure 2:
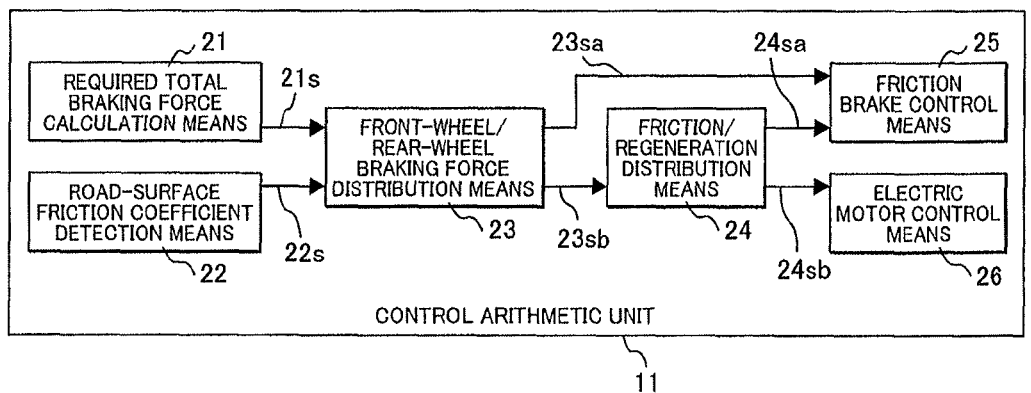
FIG. 2 is a drawing showing the control configuration of the control arithmetic unit.

FIG. 2 shows the control configuration of the control arithmetic unit 11. The control arithmetic unit 11 comprises a required total braking force calculation means 21, road-surface friction coefficient detection means 22, front-wheel/rear-wheel braking force distribution means 23, friction/regeneration distribution means 24, friction brake control means 25, and an electric motor control means 26.

The required total braking force calculation means 21 calculates the required total braking force 21s based on the operation quantity of the brake pedal 1 operated by a driver and information from the vehicle state detector and outputs the value to the front-wheel/rear-wheel braking force distribution means 23.

The road-surface friction coefficient detection means 22 detects a road-surface friction coefficient 22s by the estimation based on the information sent from the vehicle state detector and outputs the value to the front-wheel/rear-wheel braking force distribution means 23. Estimation of the road-surface friction coefficient based on the information from the vehicle state detector can be made based on, for example, the maximum detection value of the front-back acceleration sensor and the lateral acceleration sensor of the vehicle. Further, for example, the road-surface friction coefficient can be estimated according to the wheel's rotational acceleration to the braking force and the steering gear's restoring torque to the wheel's transverse angle. Furthermore, for example, it is possible to use a method to estimate the road-surface friction coefficient by detecting the road surface drying condition by using a noncontact sensor such as an optical sensor or a camera.

The front-wheel/rear-wheel braking force distribution means 23 controls distribution of the required total braking force to the front-wheel braking force and the rear-wheel braking force. The distribution control is to be executed by using a predetermined distribution line. When regenerative braking is possible, a regeneration distribution line is used, and when regenerative braking is not possible, that is, when braking is executed only by using a friction brake 6, a non-regeneration distribution line is used. Specifically, the point at which the required total braking force from the required total braking force calculation means 21 is satisfied is searched on the regeneration distribution line and the non-regeneration distribution line, and the required total braking force is distributed to both of the front and rear wheels at the distribution ratio on the searched point and then the front wheel target braking force 23sa and the rear-wheel target braking force 23sb are obtained. Then, the front wheel target braking force 23sa is outputted to the friction brake control means 25, and the rear-wheel target braking force 23sb is outputted to the friction/regeneration distribution means 24.

Herein, the distribution line is a curve plotted by changes in the relationship between the front wheel and rear wheel braking forces associated with changes of the required total braking force on the coordinates that plot the front-wheel braking force in the horizontal axis and rear-wheel braking force in the vertical axis, that is, transition of the ratio of distribution to both of the front and rear wheels associated with changes in the required total braking force.

As described later in this document, the regeneration distribution line used in cases when regenerative braking is possible is required to be located within the rear-wheel dominant range in which the distribution ratio is inclined toward rear wheels when compared to an ideal distribution line which provides distribution that enables the front and rear wheels to simultaneously lock, and the regeneration distribution line is also required to be located within the range not greater than the rear-wheel locking limit braking force that enables the rear wheels to lock in relation with a road-surface friction coefficient detected by the road-surface friction coefficient detection means 22. Furthermore, the regeneration distribution line can be obtained on the condition that the rear-wheel braking force change ratio which is a rear-wheel braking force change ratio with regard to the change of the front-wheel braking force associated with the change of the required total braking force (a division value obtained by dividing a differential value of the rear-wheel braking force change associated with the change of the required total braking force by a differential value of the front-wheel braking force change associated with the change of the required total braking force) is always positive; that is, on the condition that the change of the rear-wheel braking force associated with change of the required total braking force is monotonous with regard to the change of the front-wheel braking force.

The regeneration distribution line changes according to the road-surface friction coefficient. That is, a different regeneration distribution line is used according to the road-surface friction coefficient detected by the road-surface friction coefficient detection means 22. Concerning this, it is possible to change a predetermined regeneration distribution line according to the road-surface friction coefficient upon braking and use the distribution line for distribution control. It is also possible to predetermine regeneration distribution lines which respectively correspond to expected different road-surface friction coefficients, select a regeneration distribution line from those according to the road-surface friction coefficient, and use it for distribution control.

On the other hand, a non-regeneration distribution line used in cases when regenerative braking is impossible is specified so that the non-regeneration distribution line resembles an ideal distribution line and the distribution ratio is inclined toward front wheels when compared to the ideal distribution line.

The friction/regeneration distribution means 24 further distributes the rear-wheel target braking force 23$sb$ to a rear-wheel target friction braking force (rear-wheel target friction brake braking force) 24$sa$ and a target regenerative braking force (electric motor target braking force) 24$sb$ and outputs the rear-wheel target friction braking force 24$sa$ to the friction brake control means 25 and target regenerative braking force 24$sb$ to the electric motor control means 26.

The friction brake control means 25 controls the pressure of the friction brake by adjusting the current of the friction brake controller 12.

The electric motor control means 26 controls motor torque by adjusting the current of the electric motor 13.

Figure 3:
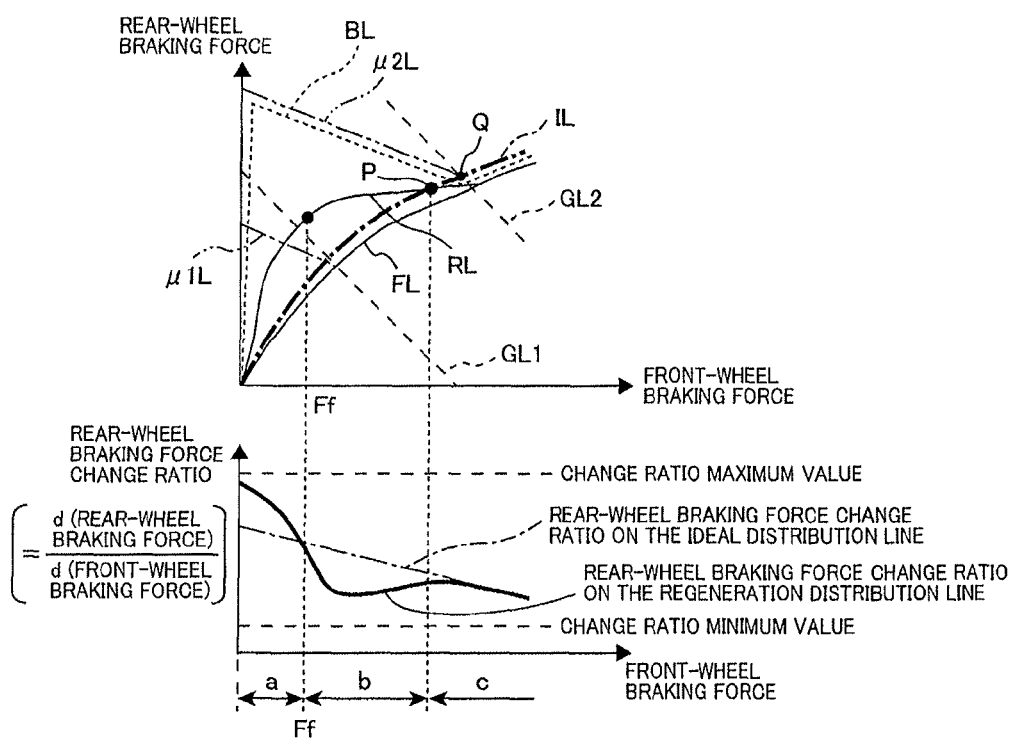
FIG. 3 is a drawing showing examples of regeneration, ideal, and non-regeneration distribution lines as well as their relationships and relationships with the total braking force.

The upper portion of FIG. 3 shows examples of regeneration, ideal, and non-regeneration distribution lines as well as their relationships and relationships with the total braking force. As stated above, the distribution line is a line plotted by changes in the relationship between the front and rear wheel braking forces associated with changes in the required total braking force on the coordinate system that plots front-wheel braking force on the horizontal axis and rear-wheel braking force on the vertical axis. In the coordinate system that provides the distribution line, as a straight line with a gradient of "−1," a constant line of total braking force (total braking force line GL) can be obtained. FIG. 3 shows the total braking force line GL1 for the required total braking force F1 and the total braking force line GL2 for the required total braking force F2.

As stated above, the ideal distribution line IL is a distribution line for providing distribution that enables the front and rear wheels to simultaneously lock. The ideal distribution line IL has the characteristic that its gradient gradually decreases as the total braking force increases. Such gradual decrease of the gradient of the ideal distribution line IL is caused due to the difference of friction characteristics between the front wheels and rear wheels in that the frictional force of the front wheel upon braking becomes larger than that of the rear wheel.

When compared to the distribution by the ideal distribution line IL, if the front-wheel braking force is made larger, the front wheels lock first, and if the rear-wheel braking force is made larger, the rear wheels lock first. When the rear wheels lock first, the vehicle's traveling stability is deteriorated. Therefore, generally, a distribution line for distribution control is to be specified in the range where the front wheels lock first, that is, the range where the distribution ratio is inclined toward the front wheels when compared to the ideal distribution line IL.

However, even in the rear-wheel inclined range, that is, the range in which the distribution ratio is inclined toward the rear wheels when compared with the ideal distribution line IL, distribution is possible that does not allow the rear wheels to lock first in relation to the road-surface friction coefficient upon braking. For this reason, by continuously detecting the road-surface friction coefficient $\mu$ by the road-surface friction coefficient detection means 22, specifying the regeneration distribution line RL in the rear-wheel inclined range based on the detected road-surface friction coefficient $\mu$, and executing distribution control by using the regeneration distribution line RL, it is possible to increase the ratio of distribution to the rear wheels within the range where traveling stability is not deteriorated. Therefore, it is possible to increase the amount of regeneration and increase energy efficiency while ensuring sufficient traveling stability.

As stated above, regeneration distribution line RL correlates with the road-surface friction coefficient $\mu$. Specifically, the regeneration distribution line RL needs to be located in the range not greater than the rear-wheel locking limit braking force under the road-surface friction coefficient $\mu$.

Herein, the rear-wheel locking limit braking force is a rear-wheel braking force that enables the rear wheels to lock first under the road-surface friction coefficient $\mu$. With regard to the rear-wheel locking limit braking force, the rear-wheel locking limit line can be obtained. For example, in the case of $\mu=\mu1$, $\mu=\mu2(\mu1<\mu12)$, the rear-wheel locking limit line $\mu1L$ and rear-wheel locking limit line $\mu2L$ can be obtained. Those rear-wheel locking limit lines are straight lines with a negative gradient gentler than that of the total braking force line GL.

By relating to such a rear-wheel locking limit line, a rear-wheel maximum distribution line can be obtained which maximizes the ratio of distribution to the rear wheels in the range in which the rear wheels do not lock first. FIG. 3 shows the rear-wheel maximum distribution line BL in the case of $\mu=\mu2$. If the road-surface friction coefficient is $\mu2$ upon braking, by specifying the regeneration distribution line RL so that it is located in the range not greater than the rear-wheel maximum distribution line BL, it is possible to maximize the ratio of distribution to the rear-wheel braking force while avoiding the situation in which the rear wheels lock first.

Based on the above, if the distribution ratio is inclined toward the rear wheels when compared with an ideal distribution line IL and the road-surface friction coefficient is $\mu2$, the regeneration distribution line RL can be specified on the condition that it is located within the rear-wheel dominant range not greater than the rear-wheel maximum distribution line BL determined by the rear-wheel locking limit line $\mu2L$ of the road-surface friction coefficient $\mu2$.

As stated above, the regeneration distribution line RL is specified so that it can satisfy both the rear-wheel inclined condition in relation to the ideal distribution line IL and the rear-wheel locking limit braking force condition. However, when only those conditions are applied, changes in the front-wheel braking force and rear-wheel braking force associated with changes in the total required braking force may become too rapid due to the relationship with the responsiveness of friction braking and regenerative braking. If such a situation occurs, control accuracy over the required braking force may not be sufficiently ensured, which may deteriorate smooth braking.

Therefore, the monotonicity condition is further applied to the regeneration distribution line RL. Specifically, changes in the rear-wheel braking force associated with changes in the required total braking force are required to be monotonous with regard to changes in the front-wheel braking force. In other words, the ratio of change in the rear-wheel braking force, which is a ratio of change in the rear-wheel braking force with regard to the change in the front-wheel braking force associated with the change in the required total braking force, is required to always be positive; that is, the gradient of the regeneration distribution line RL is required to always be positive. By executing distribution control based on the regeneration distribution line RL that satisfies such a monotonicity condition, the braking force of the front wheels and rear wheels always increases when the required total braking force increases, and the braking force of the front wheels and rear wheels always decreases when the required total braking force increases. That is, for example, situations will not occur in which the braking force of the front wheels or rear wheels decreases as the required total braking force increases, and also situations will not occur in which one-sided braking force of either the front wheels or rear wheels must control the total braking force. As a result, even if the amount of regeneration is increased by the rear-wheel inclined distribution rather than the ideal distribution by using the ideal distribution line IL, it is possible to suppress changes in the braking force of both the front and rear wheels associated with rapid changes in the required total braking force. By doing so, control accuracy over the required braking force can be sufficiently ensured, thereby increasing the smoothness of braking.

It is preferable that the requirement related to the rear-wheel braking force change ratio be further applied to the regeneration distribution line RL which satisfies the above-mentioned monotonicity condition. As the distribution ratio further inclines toward the rear wheels in relation to the ideal distribution line IL, the ratio of the rear wheels' controlling the total braking force increases, and the responsivity of the braking force required by both the front and rear wheels increases. This becomes a factor to decrease control accuracy over the required braking force. The requirement for the rear-wheel braking force change ratio is to be applied to effectively solve this problem and is effective for further increasing the smoothness of braking.

With regard to the reference braking force properly specified for the front-wheel braking force, the requirement related to the rear-wheel braking force change ratio prescribes the relationship between the rear-wheel braking force change ratio on the regeneration distribution line RL and the rear-wheel braking force change ratio on the ideal distribution line IL. Specifically, when the front-wheel braking force is smaller than the reference braking force, the rear-wheel braking force change ratio on the regeneration distribution line RL is required to become larger than the rear-wheel braking force change ratio on the ideal distribution line IL, and when the front-wheel braking force is larger than the reference braking force, the rear-wheel braking force change ratio on the regeneration distribution line RL is required to become smaller than the rear-wheel braking force change ratio on the ideal distribution line IL.

The lower portion of FIG. 3 shows the requirement for the rear-wheel braking force change ratio. Reference braking force Ff is specified for the front-wheel braking force. The reference braking force Ff can arbitrarily be specified within the range in which the gradient of the regeneration distribution line RL is always positive. In the range (range a in the drawing) of the front-wheel braking force that is not greater than the reference braking force Ff, the rear-wheel braking force change ratio on the regeneration distribution line RL is required to be larger than the rear-wheel braking force change ratio on the ideal distribution line IL and not greater than the maximum value of the predetermined change ratio. On the other hand, in the range (range b in the drawing) of the front-wheel braking force that is greater than or equal to the reference braking force Ff and not greater than the intersecting point P between the regeneration distribution line RL and the ideal distribution line IL, the rear-wheel braking force change ratio on the regeneration distribution line RL is required to be larger than zero and smaller than the rear-wheel braking force change ratio on the ideal distribution line IL. This means that the change ratio on the regeneration distribution line RL before and after the reference braking force Ff should be prescribed and the maximum and minimum values of the change ratio on the regeneration distribution line RL should also be prescribed.

Distribution control by the regeneration distribution line RL as stated above is used when regenerative braking is possible. On the other hand, if regenerative braking is not possible, for example, when the electric energy generated in the electric motor 13 due to regenerative braking cannot be stored in the vehicle's battery, braking is executed only by the friction brake 6 and in that case, distribution control is executed by using the non-regeneration distribution line FL. The non-regeneration distribution line FL is specified so that it resembles the ideal distribution line IL and the distribution ratio is slightly inclined toward the front wheels when compared with the ideal distribution line IL.

Herein, distribution control by the above-mentioned regeneration distribution line RL is generalized as the distribution control by means of regeneration distribution. The regeneration distribution is required to be within the rear-wheel dominant range where the distribution rate is inclined toward the rear wheels when compared with the ideal distribution and also within the range that is not greater than the rear-wheel locking limit braking force, and it is also required that the rear-wheel braking force change ratio is always positive.

With regard to distribution control by the above-mentioned regeneration distribution line RL, it is preferable that corrections are made according to the change direction and the change rate of the required total braking force and also that corrections are made according to the control error of the friction brake controller 12.

First of all, corrections according to the change direction and the change rate of the required total braking force will be described. Generally, in a hydraulic friction brake controller 12, responsivity of the braking force tends to become slower than that of the electric motor 13. Further, in the hydraulic friction-braking unit 12, responsivity of the braking force in the direction of increase tends to become slower than the responsivity of the braking force in the direction of decrease. For this reason, control accuracy at the increase in front-wheel braking force may become insufficient.

Figure 4:
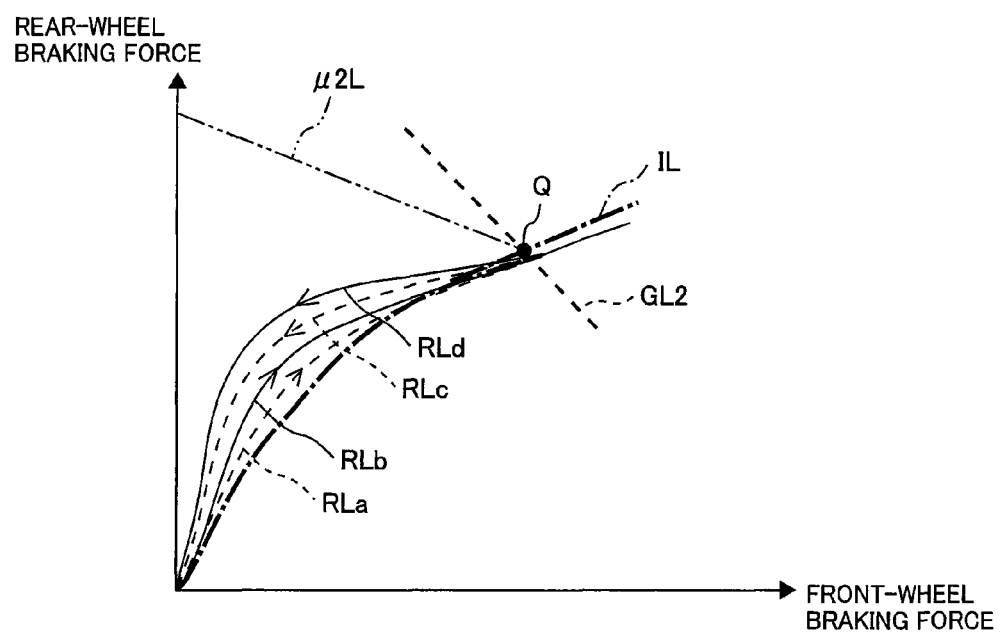
FIG. 4 is a drawing showing an example of a corrected regeneration distribution line.

Therefore, as shown in FIG. 4, for example, corrected regeneration distribution lines RLa, RLb, RLc, and RLd, which have been obtained by correcting the regeneration distribution line RL in FIG. 3 according to the change direction and the change rate of the required total braking force, are to be obtained every time and distribution control is to be executed by using the corrected regeneration distribution lines RLa, RLb, RLc, and RLd.

Corrected regeneration distribution lines RLa and RLb are increase direction regeneration distribution lines when the required total braking force is in the increasing direction, and the corrected regeneration distribution lines RLc and RLd are decrease direction regeneration distribution lines when the required total braking force is in the decreasing direction. As shown by those lines, the corrected regeneration distribution lines RLa, RLb, RLc, and RLd are obtained so that the relationship of "the rear-wheel distribution ratio when the required total braking force is in the increase direction becomes smaller than the rear-wheel distribution ratio when the required total braking force is in the decrease direction" is established.

Further, the increase-direction regeneration distribution line RLa is a rapid-increase-direction regeneration distribution line in cases when the required total braking force rapidly increases, and the increase-direction regeneration distribution line RLb is a slow-increase-direction regeneration distribution line in cases when the required total braking force slowly increases. Similarly, the decrease-direction regeneration distribution line RLc is a rapid-decrease-direction regeneration distribution line in cases when the required total braking force rapidly decreases, and the decrease-direction regeneration distribution line RLd is a slow-decrease-direction regeneration distribution line in cases when the required total braking force slowly decreases. As shown by those lines, corrected regeneration distribution lines RLa, RLb, RLc, and RLd can also be obtained so that the relationship of "the rear-wheel distribution ratio when the required total braking force rapidly changes becoming smaller than the rear-wheel distribution ratio when the required total braking force slowly changes" is established.

By making corrections according to the direction of change and the rate of change of the required total braking force, it is possible to ease the responsiveness of the braking force necessary for both front and rear wheels and further increase control accuracy over the required total braking force, thereby enabling smoother braking.

Figure 5:
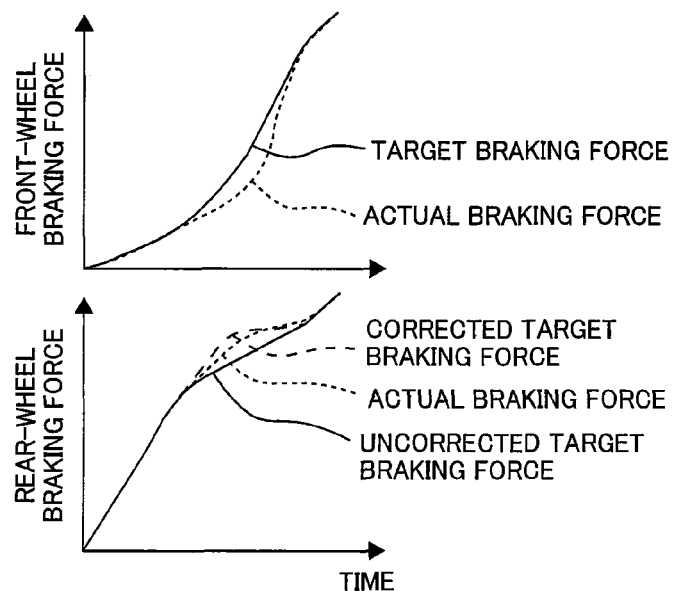
FIG. 5 is an explanatory drawing showing the correction of control error.
Figure 5:
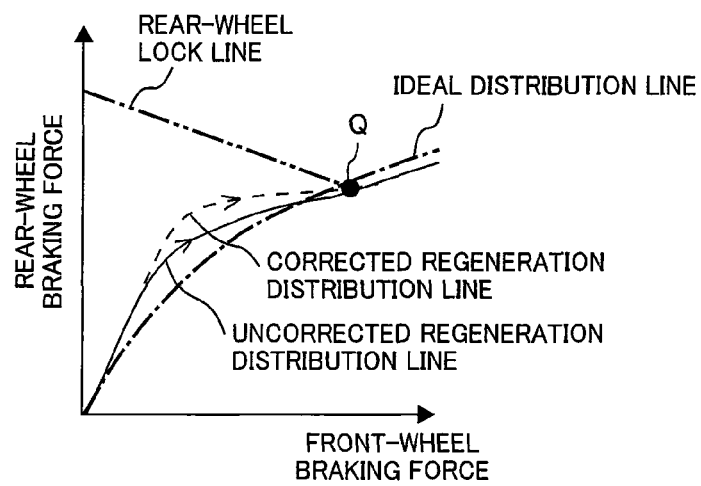

Next, the correction of control errors of the friction brake controller 12 will be explained. FIG. 5 shows an example of the control error correction. The upper portion of FIG. 5(*a*) shows the situation in which the brake is applied to the front wheels with a target braking force obtained by the above-mentioned corrected regeneration distribution line, the actual braking force cannot follow the target braking force due to insufficient responsiveness of the friction brake controller 12, causing an error between the target braking force and the actual braking force. If this kind of tracking error occurs, braking force should be added by using an electric motor 13 having better responsiveness than that of the friction brake controller 12. Specifically, as shown in the lower portion of FIG. 5(*a*), tracking capability of the required total braking force can be ensured by increasing the target braking force of the rear wheels. This means that distribution control is executed by correcting distribution by using a regeneration distribution line, shown in FIG. 3 and FIG. 4, so that the tracking delay in the front wheels can be compensated for by an increase in the rear-wheel target braking force. Such corrections can be made on the condition that the tracking error exceeds the predetermined threshold. That is, distribution control is to be executed by increasing the ratio of distribution to the rear wheels so that the required total braking force can be satisfied when the tracking error becomes equal to or greater than the threshold.

When the above-mentioned correction is made, consequently, the regeneration distribution line, shown in FIG. 3 and FIG. 4, becomes the "corrected regeneration distribution line" shown in FIG. 5(*b*). As a result, it is possible to avoid the occurrence of situations in which the actual braking force of the front wheels by friction braking cannot follow the target braking force, thereby sufficiently ensuring control accuracy over the required total braking force and achieving smoother braking.

Figure 6:
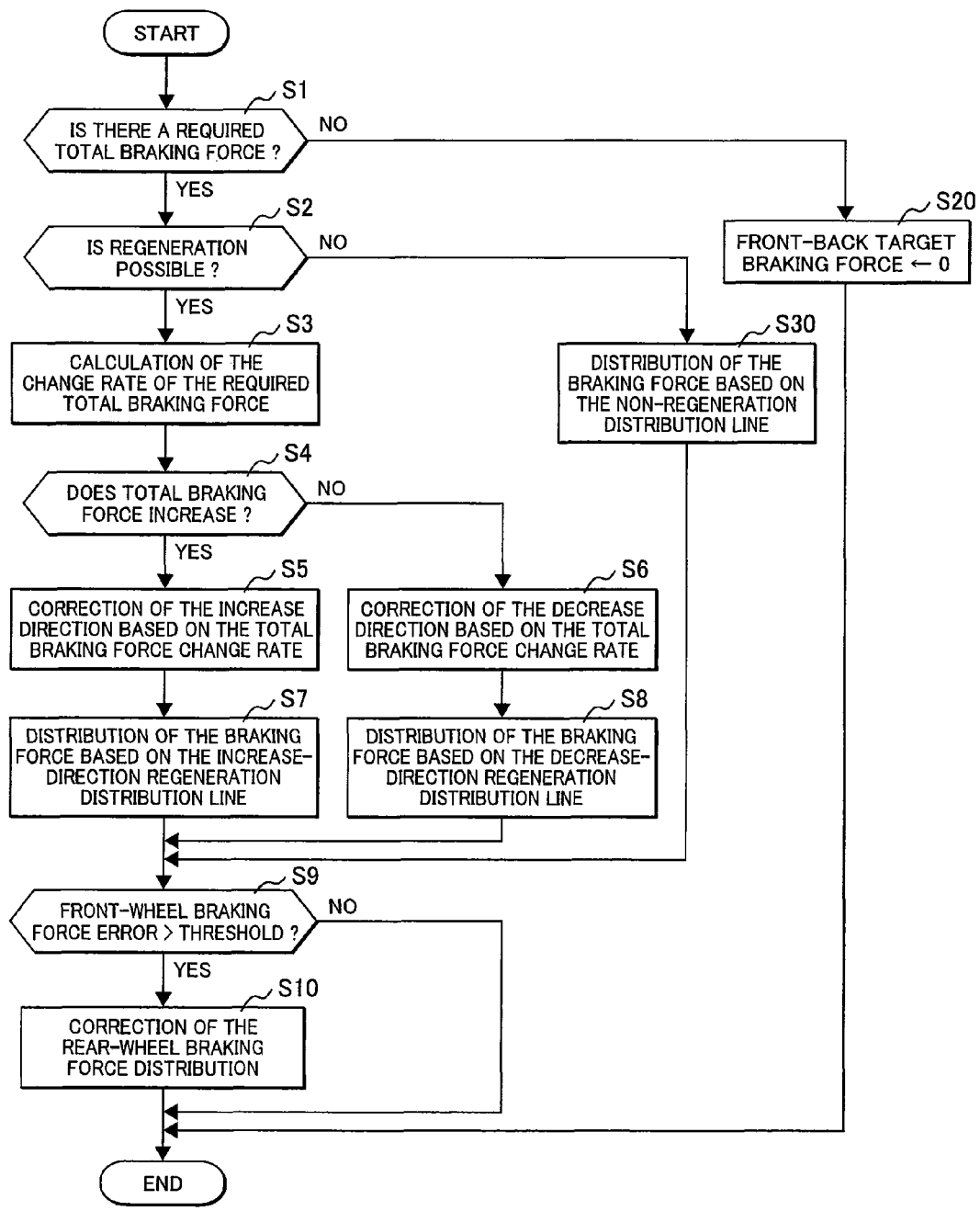
FIG. 6 is a drawing showing the flow of distribution control.

Hereafter, the required total braking force distribution control executed by the front-wheel/rear-wheel braking force distribution means 23 will be explained. FIG. 6 shows the flow of distribution control. In step S1, the presence or absence of the required total braking force is judged. When there is no required total braking force, the process proceeds to step S20 and the target braking force of both the front and rear wheels is set at zero. On the other hand, when there is a required total braking force, the process proceeds to step S2 and it is judged whether regeneration is possible or not. Availability of regeneration is judged according to the battery storage condition or the like. When regeneration is impossible, the process proceeds to step S30 and the target braking force of both the front and rear wheels is calculated by using the non-regeneration distribution line. On the other hand, when regeneration is possible, the process proceeds to step S3 and the change rate of the required total braking force is calculated. In subsequent step S4 following step S3, the change direction of the required total braking force is judged. Specifically, the change direction is judged by evaluating whether it is an increase direction or not. When the direction is an increase direction, the process proceeds to step S5, and when the direction is a decrease direction, the process proceeds to step S6.

In step S5, the increase direction is corrected. In the increase-direction correction, if the above-mentioned example is taken, the regeneration distribution line RL in FIG. 3 is corrected to become an increase-direction regeneration distribution line RLa or RLb in FIG. 4 according to the increase rate of the required total braking force. On the other hand, in step S6, the decrease direction is corrected. In the decrease-direction correction, if the above-mentioned example is taken, the regeneration distribution line RL in FIG. 3 is corrected to become a decrease direction regeneration distribution line RLc or RLd in FIG. 4 according to the decrease rate of the required total braking force.

In step S7 following step S5, the target braking force of both the front and rear wheels is calculated based on the increase-direction regeneration distribution line, then, the process proceeds to step S9. On the other hand, in step S8 following step S6, the target braking force of both the front and rear wheels is calculated based on the decrease-direction regeneration distribution line, then the process proceeds to step S9. In step S9, an error between the target braking force and the actual braking force is judged. Specifically, an error between the target braking force and the actual braking force is calculated, and it is judged whether the calculated tracking error is larger than the threshold or not. When it is judged that the tracking error does not exceed the threshold, the procedure will end. On the other hand, when it is judged that the tracking error is larger than the threshold, that is, when it is judged that the control error needs to be corrected, the process proceeds to step S10 wherein the above-mentioned control error correction is executed, then, the procedure will end.

Figure 7:
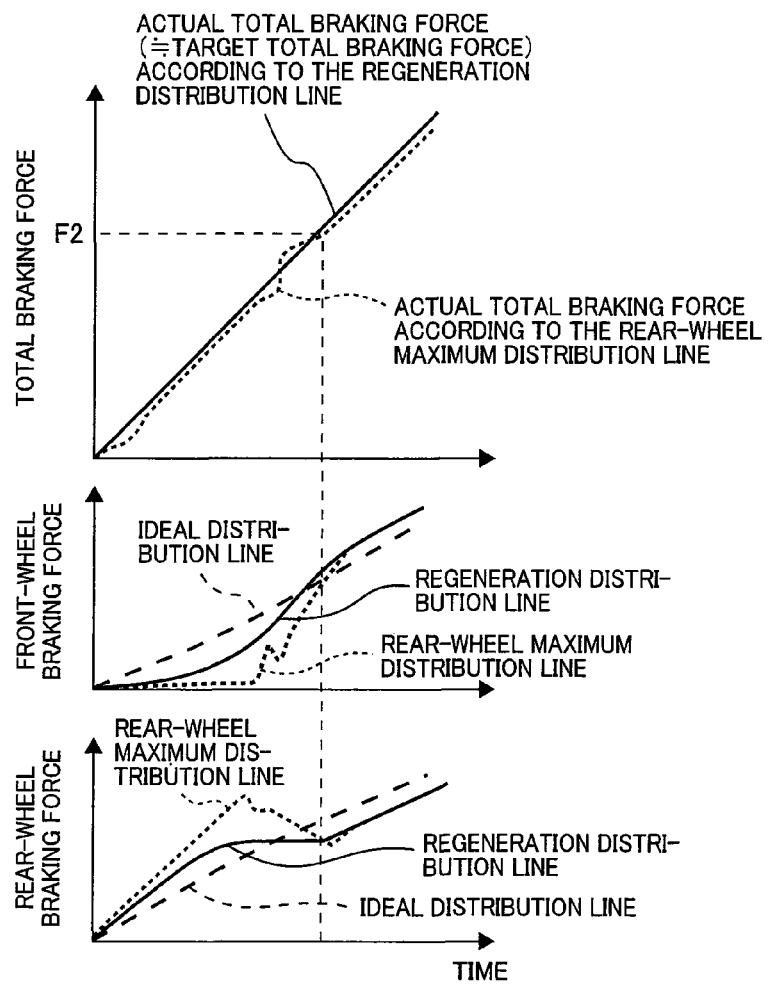
FIG. 7 is a drawing showing an example of an actual braking situation controlled by the braking controller according to the present invention.

FIG. 7 shows an example of an actual braking state in which braking control is executed by the above-mentioned braking controller 10 under the condition in which the required total braking force gently and monotonously increases in a ramp-like manner. For comparison, an example of an actual braking state is simultaneously shown in which braking control is executed based on the rear-wheel locking limit braking force. Furthermore, as shown in FIG. 3, the example of FIG. 7 is taken on the condition that the total braking force line GL2 in the required total braking force of F2 passes through the intersecting point Q between the rear-wheel locking limit line μ2L and the ideal distribution line IL.

In FIG. 7, the solid line shows the actual total braking force when the braking controller 10 executes braking control, and the broken line shows the actual total braking force when braking control is executed based on the rear-wheel locking limit braking force. Herein, braking control based on the rear-wheel locking limit braking force means the control braking by distribution control using the rear-wheel maximum distribution line BL in FIG. 3 as a distribution line, that is, control braking based on the rear-wheel maximum distribution line, and, for example, this technology corresponds to the previously mentioned technology in patent literature 2.

In the case of braking control based on the rear-wheel maximum distribution line, the braking force of the rear wheels rapidly increases at the start of braking, temporarily decreases in the middle of the process in which total braking force reaches F2, and increases again when the total braking force becomes equal to or more than F2. Thus, in the braking control based on the rear-wheel locking limit braking force, even when the target total braking force monotonously increases, the target braking force of the rear wheels can both increase and decrease. For this reason, the target value tracking capability tends to become insufficient. As a result, control accuracy over the required total braking force decreases, which may cause vehicle deceleration and front-back vibration which are not expected by a driver.

Also, in the case of braking control based on the rear-wheel maximum distribution line, the braking force of the front wheels maintains zero at the start of braking, is required to rapidly increase from the middle of the process, and then response is made in almost the same manner as the ideal distribution when the total braking force becomes equal to or more than F2. In that case, if responsiveness of the friction brake controller 12 is insufficient, wasteful time and response delay may occur, which may also cause vehicle deceleration and front-back vibration which are not expected by a driver.

On the other hand, in the case of use of the braking controller 10, that is, in the case of braking control based on the regeneration distribution line that uses the above-mentioned regeneration distribution line, because the rear-wheel braking force change ratio with regard to the front wheels is prescribed as stated above, the braking force of the both the front and rear wheels gradually increases at the beginning of the braking operation, and it is possible to inhibit rapid changes of braking force of both the front and rear wheels in the middle of the process in which the total braking force reaches F2. Therefore, sufficient control accuracy over the required total braking force can be obtained, and it is possible to effectively inhibit vehicle deceleration and front-back vibration which are not expected by a driver.

Figure 8:
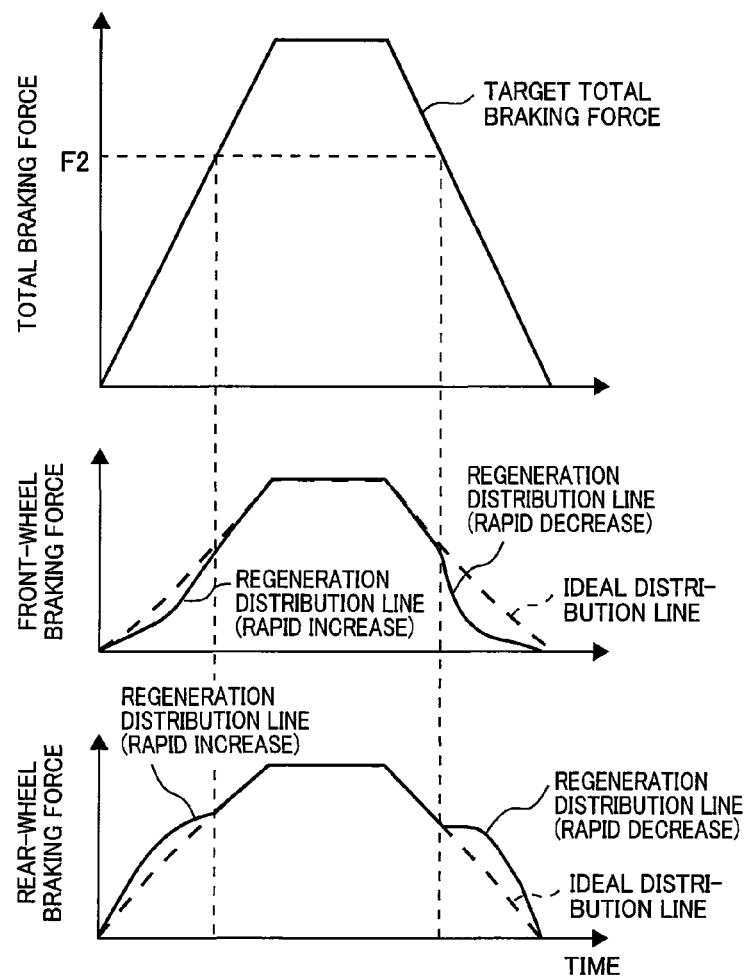
FIG. 8 is a drawing showing another example of an actual braking situation controlled by the braking controller according to the present invention.

FIG. 8 shows an example of an actual braking state in which braking control is executed by the braking controller 10 on the condition that the change rate of the required total braking force is higher than that in FIG. 7. When the required total braking force changes rapidly, as stated above, correction is to be made so that the ratio of distribution to the rear wheels decreases.

When the increase rate of the required total braking force is high, the amount of distribution to the rear wheels is inhibited. As a result, the braking force of the front and rear wheels changes in the manner closer to the changes in the ideal distribution when compared with the situation where the change rate is low. Furthermore, even when the required total braking force having a high change rate decreases, the amount of distribution to the rear wheels is inhibited. As a result, the braking force of both the front and rear wheels changes in the manner closer to the changes in the ideal distribution when compared with the situation where the change rate is low. As indicated, by changing the ratio of distribution to the rear wheels according to the change rate of the required total braking force, it is possible to inhibit the change rate of the braking force required by both the front and rear wheels, thereby effectively inhibiting vehicle deceleration and front-back vibration which are not expected by a driver.

Furthermore, the amount of distribution to the rear wheels is inhibited more significantly in the case of an increase rather than the case of a decrease. As a result, the change in braking force becomes more similar to that of the ideal distribution. Therefore, it is possible to inhibit the increase rate of the braking force required by the front wheels, and even when responsiveness of the friction brake in the increase direction is low, it is possible to effectively inhibit vehicle deceleration and front-back vibration which are not expected by a driver.

Thus, an embodiment of the present invention has been explained, however, this is only a typical example, and the present invention can be embodied in a variety of modes within the range of the concept of the invention. For example, in the above-mentioned embodiment, the present invention is applied to a vehicle equipped with an electric motor 13 only on the rear wheel. However, the present invention is not intended to be limited to the embodiment, and it can also be applied to a vehicle in which the front wheels and rear wheels have different regeneration capabilities, that is, a vehicle whose front wheels and rear wheels are asymmetrical with regard to regeneration, regardless of the vehicle's drive system and braking system.

Furthermore, in the above-mentioned embodiment, an example is shown in which the present invention is applied to a vehicle equipped with a friction brake controller 12 which can control friction braking independently from operation quantity executed by a driver; however, application can be made regardless of the system of the friction brake controller 12. For example, the present invention can be applied to a vehicle in which the braking force of the friction brake is uniquely determined concerning the operation quantity executed by a driver. In this case, total braking force changes according to the braking force of the rear wheel motor; however, by inhibiting the amount of distribution to the rear wheels and the change rate, it is possible to inhibit vehicle deceleration and front-back vibration which a driver senses as an uncomfortable feeling.

The invention claimed is:

1. A braking controller, used for braking control of a vehicle, which is capable of applying a brake to rear wheels by regenerative braking of an electric motor, comprising:
  a braking force distribution means for controlling distribution of a required total braking force provided by a driver's operation input, and
  a road-surface friction coefficient detection means for detecting a road-surface friction coefficient, wherein
  said braking force distribution means distributes said required total braking force by regeneration distribution,
  said regeneration distribution is required to be within the rear-wheel dominant range in which a distribution ratio is inclined toward the rear wheels when compared to an ideal distribution which distributes said required total braking force to enable front wheels and the rear wheels to simultaneously lock,
  said regeneration distribution is also required to be within the range not greater than a rear-wheel locking limit braking force that enables the rear wheels to lock in relation with the road-surface friction coefficient detected by said road-surface friction coefficient detection means, and a rear-wheel braking force change ratio, which is a rear-wheel braking force change ratio with regard to the change of a front-wheel braking force associated with the change of the required total braking force, is required to always be positive.

2. The braking controller according to claim 1, wherein with regard to a reference braking force specified for the front-wheel braking force, said braking force distribution means executes distribution control so that when the front-wheel braking force is smaller than said reference braking force, the rear-wheel braking force change ratio in said regeneration distribution is larger than the rear-wheel braking force change ratio in said ideal distribution, and when the front-wheel braking force is larger than said reference braking force, the rear-wheel braking force change ratio in said regeneration distribution is smaller than the rear-wheel braking force change ratio in said ideal distribution.

3. The braking controller according to claim 1, wherein said braking force distribution means executes distribution control by differentiating distribution ratios so that an increase-direction rear-wheel distribution ratio is smaller than a decrease-direction rear-wheel distribution ratio according to a change direction of said required total braking force.

4. The braking controller according to claim 1, wherein said braking force distribution means executes distribution control so that the ratio of distribution to the rear wheels decreases as a change rate of said required total braking force increases.

5. The braking controller according to claim 1, wherein said braking force distribution means executes distribution control so that when an error between a target braking force and an actual braking force of the front wheels becomes equal to or more than a predetermined threshold, the ratio of distribution to the rear wheels is increased so as to satisfy said required total braking force.

6. The braking controller according to claim 2, wherein said braking force distribution means executes distribution control by differentiating distribution ratios so that an increase-direction rear-wheel distribution ratio is smaller than a decrease-direction rear-wheel distribution ratio according to a change direction of said required total braking force.

7. The braking controller according to claim 2, wherein said braking force distribution means executes distribution control so that the ratio of distribution to the rear wheels decreases as a change rate of said required total braking force increases.

8. The braking controller according to claim 3, wherein said braking force distribution means executes distribution control so that the ratio of distribution to the rear wheels decreases as a change rate of said required total braking force increases.

9. The braking controller according claim 2, wherein said braking force distribution means executes distribution control so that when an error between a target braking force and an actual braking force of the front wheels becomes equal to or more than a predetermined threshold, the ratio of distribution to the rear wheels is increased so as to satisfy said required total braking force.

10. The braking controller according to claim 3, wherein said braking force distribution means executes distribution control so that when an error between a target braking force and an actual braking force of the front wheels becomes equal to or more than a predetermined threshold, the ratio of distribution to the rear wheels is increased so as to satisfy said required total braking force.

11. The braking controller according to claim 4, wherein said braking force distribution means executes distribution control so that when an error between a target braking force and an actual braking force of the front wheels becomes equal to or more than a predetermined threshold, the ratio of distribution to the rear wheels is increased so as to satisfy said required total braking force.

12. The braking controller according to claim 1, wherein the rear-wheel braking force change ratio is a division value obtained by dividing a differential value of a rear-wheel braking force change associated with the change of the required total braking force by a differential value of a front-wheel braking force change associated with the change of the required total braking force.

13. The braking controller according to claim 1, wherein a gradient of the regeneration distribution is required to always be positive.

14. The braking controller according to claim 1, wherein distribution control based on the regeneration distribution satisfying a monotonicity condition is executed so that braking forces of the front wheels and the rear wheels always increase when the required total braking force increases, and the braking forces of the front wheels and the rear wheels always decrease when the required total braking force increases.

* * * * *